UNITED STATES PATENT OFFICE 2,211,140

CEMENTITIOUS MATERIAL AND METHOD OF MAKING THE SAME

Francis J. Licata, New York, N. Y., assignor to National Oil Products Company, Harrison, N. J., a corporation of New Jersey No Drawing. Application February 10, 1938, Serial No. 189,900

11 Claims. (Cl. 106—27)

The invention relates, in general, to the manufacture of lime-bearing cementitious materials, and, in particular, to a novel method of grinding, waterproofing and plasticizing such materials, and to correlated improvements in the product thus obtained.

In the manufacture of cement and like cementitious materials a lime-bearing material is first crushed, dried, ground in a ball or tube mill, after which it may be blended with a predetermined quantity of a clayey material in the event that the original lime-bearing material is deficient in clayey matter. The product is then introduced into a kiln and heated to about 2000° F., more or less, to form cement clinkers. After the kiln operation, the cement clinkers are ground in a tube or ball mill, usually employing steel rods or balls, ranging usually from one to three inches in diameter, to produce the final cementitious product.

During the grinding steps, the steel balls or rods invariably become coated with powdered cement up to a thickness of ¼ inch or more, thus materially affecting the grinding efficiency of the mill. The coating of the grinding elements is referred to in the art as "gumming," and it is attributed, in some cases, to absorption of moisture from the ambient atmosphere and also to electrostatic forces built up during the grinding operation. In an attempt to combat this undesirable gumming, various cheap powdered materials such as rosin, coal dust and the like, have been admixed with the cement during grinding. These and other powdered materials have not proven successful. Rosin, for example, becomes gummy from the heat developed and coal dust serves to discolor the cement which is undesirable.

It has been proposed to use fatty acids and their soaps, but the use of such materials has enjoyed but limited success due, in part, to their high cost. The grinding costs in the manufacture of cement form a material part of the final cost of this commodity and almost any increase in grinding costs is prohibitive, especially in view of the keen competition that exists in this field.

It has now been found that a new grinding aid, waterproofing and plasticizing agent for cementitious materials may be produced from the low-grade fish oil fatty acids and fatty glycerides. These fish oils, which are composed essentially of fatty acids and fatty glycerides, may be obtained in large quantities at prices far below ordinary fatty acids. The oil residue obtained as a by-product in the vitamin extraction of fish liver oils is admirably suited for the purposes of making the combination grinding aid, plasticizer and waterproofer of the invention. Any suitable and preferably low cost fish oil is first subjected to a hydroxylation process to produce a hydroxylated oil. This oil is saponified with sodium hydroxide or any other water-soluble saponifying agent, the agent being used in an amount in excess of that required for stoichiometrical saponification. The high metallic content soap thus produced is then precipitated with a water-soluble salt of calcium, aluminum or any other suitable polyvalent metal, thereby forming the corresponding water-insoluble soap having a high metallic content. The quantity of metal, in excess of that which normally or stoichiometrically combines with the fish oil, may be varied to produce a product having the desired properties. While it has been conclusively proven that these soaps contain a high metallic content, no definite theoretical explanation can be given. Apparently the excess metal is tied up with the soap in some complex manner, which curiously enough, is highly stable. The water-insoluble soaps of calcium, aluminum, etc. produced in this manner are substantially infusible and form a fine powder upon grinding. The fish oil soaps having a high metallic content employed for effectuating the purposes of the present invention are novel in and of themselves and they, as well as the process of producing the same, form the basis of my copending application Serial No. 189,899, filed February 10, 1938.

According to the invention there is provided a process of incorporating in a lime-bearing cementitious material, preferably before or during grinding thereof, a water-insoluble soap of a hydroxylated fish oil having a metallic content in excess of the stoichiometrical ratio. The invention further presents a novel cement, containing a soap of the aforementioned type, which displays a marked improvement in homogeneity and is substantially resistant to the absorption of moisture which usually causes caking of the cement during storage and transit.

The invention accordingly comprises the several steps and relation of one or more of such steps with respect to each of the others, and a composition of matter possessing the characteristics, properties and relation of components, all of which will be exemplified in the following detailed disclosure, and the scope of the invention will be indicated in the claims.

In carrying out the process of the invention, any suitable soap of a hydroxylated fish oil may be employed, the use of the calcium soap being highly preferred. The soap must have certain definite properties, (i. e. must be finely powdered and must not fuse at a temperature below 100° C.), to effectively carry out the purposes and objects of the invention and these properties are directly dependent upon the metallic content of the soaps. It is therefore recommended that the soap be made with 30% to 100% or more excess saponifying agent, based upon the weight of the fish oil and preferably the soap should have an ash of 30% to 50% or more. While the soap may be admixed with the cement at any stage of its manufacture, or even during its use, it is highly preferred to add the soap to the cement clinkers before or during grinding thereof. The quantity of soap added will depend upon operating conditions, the type of cement, the degree of waterproofness desired, the degree of plasticity required, etc. A quantity of soap ranging from 0.20% to 3.0% based on the weight of cement has been found to be suitable. Excellent results have been obtained by using approximately one pound of the novel soap to each barrel of cement weighing about 140 lbs.

The soaps of the invention serve as an excellent grinding aid, thereby materially increasing the efficiency of this operation. These soaps impart a valuable waterproofness to the cement, thereby eliminating, or at least materially decreasing, the normal tendency of cement to absorb moisture, which invariably leads to hydration and bag setting during storage. The soap also imparts a certain degree of plasticity to the cement, thereby eliminating the use of excessive quantities of water in preparing concrete mixes, which is normally necessary to provide the desired consistency in the pouring or casting of intricate structures or products. This feature of being able to decrease the normal excessive quantities of water used, serves to retard the formation of honey combing, thereby increasing the tensile and compressive strength of the finished structure. Moreover, formation of laitance or separation of fine particles to the top is avoided by the use of less water. The inclusion of the novel soaps in cements is also effective in preventing efflorescence or powder staining in masonry work where weathering leaches out soluble salts which by evaporation of water leave white stains on brick work.

The expression "lime-bearing cementitious material" is employed herein to connote any lime-bearing hardenable cement such as Portland, masonry, natural, slag, gypsum cements, etc. From the foregoing, it may be seen that the water-insoluble high metallic content soaps of the hydroxylated fish oils are particularly valuable economically and practically in the manufacture and use of cementitious materials. Beside serving as valuable products in cement making, a profitable outlet for fish oils has been created.

Since certain changes in carrying out the above process and certain modifications in the composition which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

Having described my invention, what I claim as new and desire to secure by Letters Patent is:

1. In a process of manufacturing lime-bearing cementitious materials, the step which comprises incorporating therein a water-insoluble soap of a hydroxylated fish oil having a metallic content in excess of the stoichiometrical ratio.

2. In a process of manufacturing lime-bearing cementitious materials, the step which comprises incorporating therein a calcium soap of a hydroxylated fish oil having a metallic content in excess of the stoichiometrical ratio.

3. In a process of manufacturing lime-bearing cementitious materials, the step which comprises grinding such materials in the presence of a calcium soap of a hydroxylated cod oil having a metallic content in excess of the stoichiometrical ratio.

4. In a process of manufacturing lime-bearing cementitious materials, the step which comprises grinding cement clinkers with a water-insoluble soap of a hydroxylated fish oil having an ash value of at least 30%.

5. In a process of manufacturing lime-bearing cementitious materials, the step which comprises grinding cement clinkers with a calcium soap of a hydroxylated fish oil having an ash value of at least 30%.

6. In a process of manufacturing lime-bearing cementitious materials, the step which comprises grinding cement clinkers with a powdered, water-insoluble soap of a hydroxylated fish oil, the fusion point of the soap being above 100° C.

7. As a new composition of matter, a lime-bearing cementitious material containing a water-insoluble soap of a hydroxylated fish oil having a metallic content in excess of the stoichiometrical ratio.

8. As a new composition of matter, a lime-bearing cementitious material containing a lime soap of a hydroxylated fish oil having a metallic content in excess of the stoichiometrical ratio.

9. A new composition of matter comprising a lime-bearing cementitious material and a water-insoluble soap of a hydroxylated fish oil having an ash value of at least 30%.

10. A new composition of matter comprising a lime-bearing cementitious material and a lime soap of a hydroxylated fish oil having an ash value of at least 30%.

11. A new composition of matter comprising a lime-bearing cementitious material and 0.20% to 3.0% of a lime soap of a hydroxylated fish oil having an ash value of at least 30%.

FRANCIS J. LICATA.